(12) United States Patent
Clarke et al.

(10) Patent No.: US 11,729,239 B1
(45) Date of Patent: Aug. 15, 2023

(54) ELECTRONIC REAL-TIME COMMUNICATIONS

(71) Applicant: Samsung Electronics Company, Ltd.

(72) Inventors: Nigel Clarke, Mountain View, CA (US); Marc Estruch Tena, San Jose, CA (US); John Novak, Santa Clara, CA (US); Catherine Kim, San Jose, CA (US); Sergio Perdices-Gonzalez, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/845,548

(22) Filed: Jun. 21, 2022

(51) Int. Cl.
*H04L 65/752* (2022.01)
(52) U.S. Cl.
CPC .................. *H04L 65/752* (2022.05)
(58) Field of Classification Search
CPC ..... H04L 65/752; H04L 65/75; H04L 65/762; H04L 65/764; H04L 65/765; H04L 65/405
USPC ............... 709/206, 220, 224, 225, 227, 228
See application file for complete search history.

(56) References Cited

U.S. PATENT DOCUMENTS

| | | | | |
|---|---|---|---|---|
| 8,565,718 B1 * | 10/2013 | Erman | .................. | H04W 48/06 455/414.1 |
| 9,532,004 B1 * | 12/2016 | Metter | .................. | H04N 7/152 |
| 9,805,595 B1 * | 10/2017 | Liebinger Portela | .. | G08G 1/012 |
| 10,893,206 B1 | 1/2021 | Bart | | |
| 10,897,633 B2 | 1/2021 | Zhang | | |
| 11,431,781 B1 * | 8/2022 | Carofiglio | ........ | H04N 21/64723 |
| 2011/0018998 A1 * | 1/2011 | Guzik | .................... | H04N 21/21 348/143 |
| 2013/0021933 A1 * | 1/2013 | Kovvali | ................ | H04W 88/18 370/252 |
| 2015/0256581 A1 * | 9/2015 | Kolhi | ...................... | H04L 65/80 709/219 |
| 2015/0350813 A1 * | 12/2015 | Prats | ..................... | H04L 67/125 709/208 |
| 2019/0166334 A1 * | 5/2019 | Tuo | ......................... | B64D 47/08 |
| 2020/0014961 A1 | 1/2020 | Ramaswamy | | |
| 2021/0067819 A1 | 3/2021 | Sen | | |
| 2021/0281800 A1 * | 9/2021 | Singh | ..................... | H04L 65/65 |

FOREIGN PATENT DOCUMENTS

| | | | | | |
|---|---|---|---|---|---|
| CA | 2722300 | A1 * | 11/2008 | ....... | G06F 17/30017 |
| CA | 2885087 | A1 * | 3/2014 | .......... | H04L 47/803 |
| CN | 109391847 | | 2/2019 | | |

* cited by examiner

Primary Examiner — Khanh Q Dinh

(57) ABSTRACT

In one embodiment, a method includes accessing real-time content captured by a first user's client device, where the real-time content is captured at a first high quality and is one of a plurality of content frames in a real-time stream of content. The method includes downgrading the quality of the real-time content to a second lower quality for transmission to a second user and transmitting the downgraded content to the second user. The method includes determining, based on a request made by the second user, an area of interest of a subsequent real-time image, where the subsequent real-time image is at the first high quality, modifying the subsequent real-time image to focus on the area of interest, where the modified subsequent real-time image is at the first high quality, and downgrading and transmitting the modified subsequent real-time image for to the second user.

20 Claims, 6 Drawing Sheets

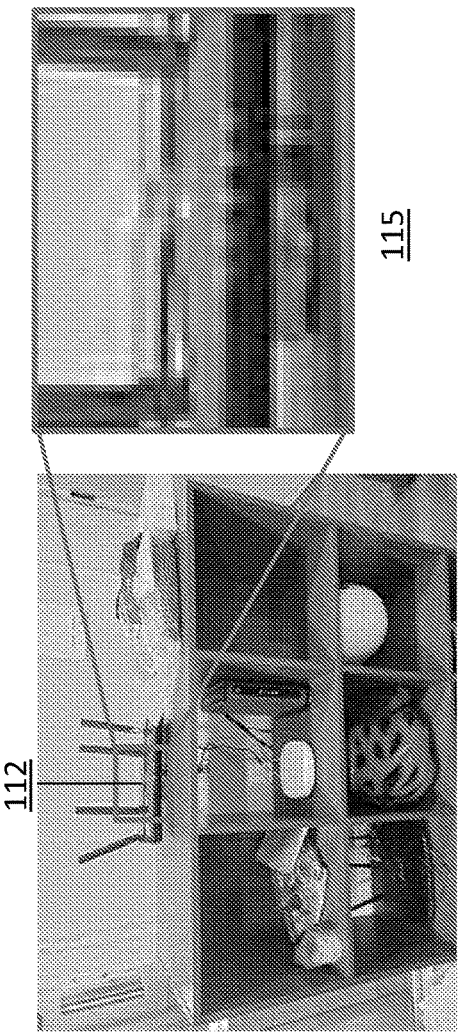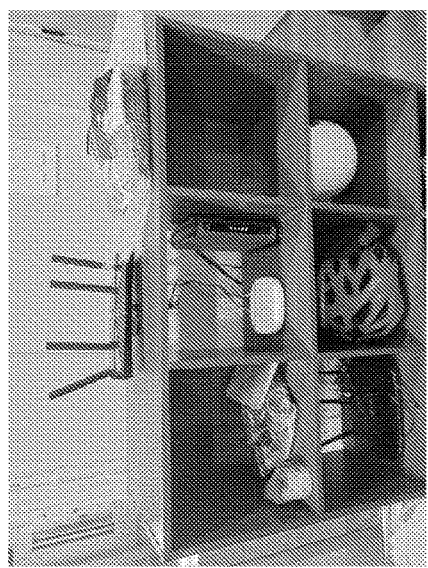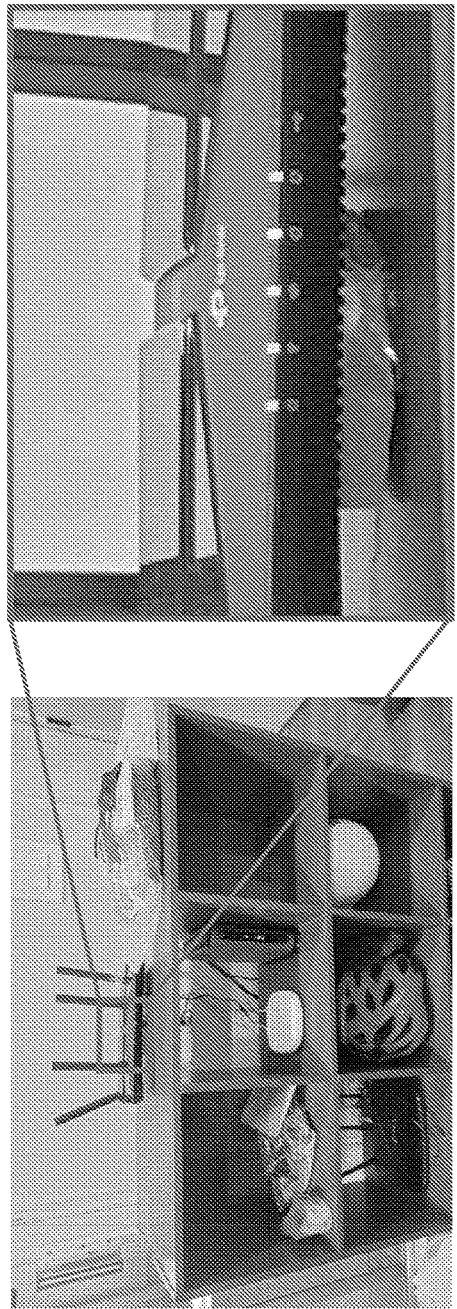
Fig. 1A
Fig. 1B

US 11,729,239 B1

ELECTRONIC REAL-TIME COMMUNICATIONS

TECHNICAL FIELD

This disclosure generally relates to real-time electronic communications between users.

BACKGROUND

Electronic communication—such as phone calls, video calls, and chats—is a ubiquitous form of communication. Electronic communications can be grouped into two categories: synchronous and asynchronous. Synchronous electronic communications include live or real-time interactions such as video chats or phone calls. Asynchronous communication includes activities such as emails, sharing pictures or video files, or exchanging text messages. These interactions are not necessarily live and therefore do not have the same bandwidth limitations as do live or real-time interactions. As a result, asynchronous content can be shared with fewer data-transfer limitations and larger amounts of data can be sent without the compression techniques often required for live communications to occur in real time.

BRIEF DESCRIPTION OF THE DRAWINGS

FIGS. 1A and 1B illustrate example images transmitted during a real-time electronic communication.

DESCRIPTION OF EXAMPLE EMBODIMENTS

Figure 2:
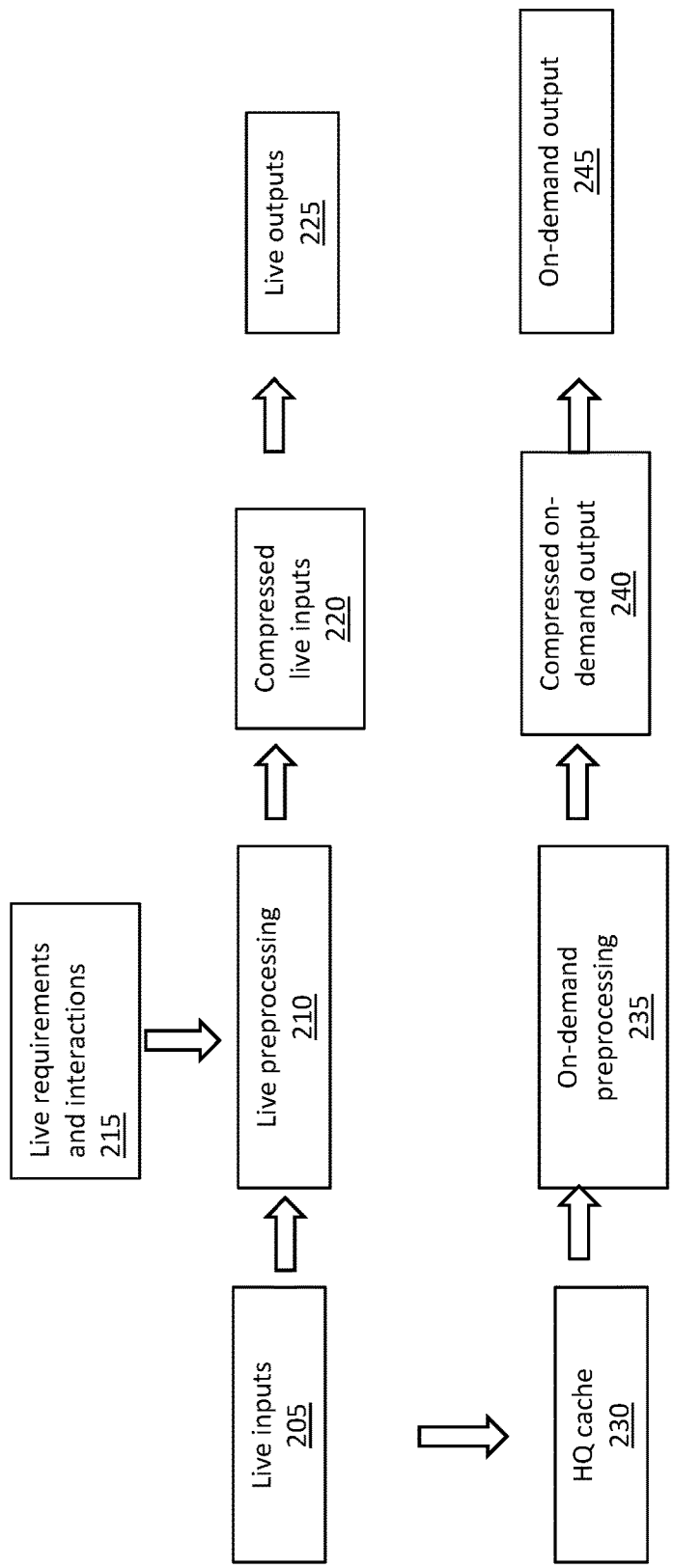
FIG. 2 illustrates a diagram of an example embodiment that provides high-quality electronic communications between users.

Two or more users can communicate electronically using many different types of communication. Synchronous communications, also referred to real-time communications, enable live communications between users. For example, users may be synchronously communicating using a live video stream that transmits images of, e.g., a first user or the first user's environment to a second user, and vice versa. While there may be a slight time delay due to processing, buffering, and/or transmission between what the first user sees or does and the second user's view of the first user, such communications occur substantially live or in real-time, creating a real-time feedback loop that allows users to, e.g., simulate an in-person conversation.

Asynchronous communications between two or more users do not simulate an in-person, real-time conversation but instead involve iterative, turn-based, often discretized communications such as text messages, email, etc. Asynchronous communications often allow users to view (and/or listen to) and peruse previous communications.

Bandwidth and data transmission limitations affect synchronous communications much more than asynchronous communications, as lag, transmission delays, or other issues that disrupt the quality and timing of synchronous communications disrupt the live flavor of synchronous communications and can cause lost data (e.g., missing frames, etc.) that disrupt the communications. As a result, synchronous communications typically use lower quality data than do asynchronous communications. For example, a real-time video transmission may involve streaming a sequence of images (i.e., the video frames) at lower resolutions than the resolution at which the video frames are actually captured by, or stored on, the transmitting device.

For example, a user may capture video at, e.g., 8K resolution at 24 frames per second (fps), or 1080p video at 240 fps, or 720 video at 960 fps. In contrast, due to bandwidth limitations, these frames may be downgraded when transmitted to a user viewing the video. For example, the images may be compressed to a lower resolution (e.g., 480p); to have less range in color or intensity values; and/or to have fewer frames per second. Downgrading data may include compressing the data, down-sampling the data, or discarding data deemed less important, such as frequency ranges in audio transmissions, cropping portions of images, reducing the values variables (e.g., color, intensity, etc.) can take, and the like. For example, in real-time transmission an 8k image may be reduced to 720p resolution, compressed, and the streamed, resulting in significant lower image quality compared to the original 8k image.

In contrast, asynchronous communications can be transmitted at higher quality, at least because transmission delays are inherently less noticeable or unnoticeable given the asynchronous, turn-based nature of such communications. For example, if a first user texts a second user a video, a high-quality video may take more time to arrive at the second user than would a low-quality video, but the delay will typically not be noticed at all by the second user, and may not degrade the quality of the overall communication because the communication may not depend on real-time interaction. However, while asynchronous communications typically permit higher-quality data transmissions, they do not have the life-like feel of synchronous communications and are inferior at communications that benefit from shared, real-time context (e.g., one user communicating an instruction to another user to "look to your right"), the ability to quickly reference things that are happening, or an awareness of the other user's current context, such as current events in the user's environment displayed in a real-time video feed.

As discussed above, high-quality data may essentially be wasted in synchronous communications, as the data may be downgraded or stripped out entirely for streaming to another user. As a result, synchronous streamed data creates inferior user experiences for interactions such as zooming in on image elements, saving portions of the communications (e.g., snapshots) for later use, analyzing or experiencing data that has been discarded, etc. For example, FIG. 1A illustrates an example of the problems that downgrading data can cause. Image 105 illustrates an example high-quality image (e.g., a 4K image). Image 110 illustrates a downgraded image (e.g., 480p). While image 110 is inferior to image 105 in certain respects, the content is at least still discernable. However, if a user receiving image 110 attempts to zoom in on a portion 112 of image 110 (e.g., to determine the status of lights on the router shown in image 110), the resulting zoomed-in image is too low quality to be useful, as illustrated in image 115 showing portion 112 of image 110 as zoomed in, because zooming in on a downgraded (e.g., compressed) image results in significant loss of image quality.

In contrast, FIG. 1B illustrates an example output of an example embodiment of this disclosure. Image 120 illustrates the example high-quality image (e.g., a 4K image) of image 105. However, image 125 illustrates a zoomed-in image transmitted and viewed by a second user. Image 125 corresponds to image 115 showing portion 112 of image 110. However, as illustrated in FIGS. 1A and 1B, details in image 125 are much more discernable than are details in image 115 as, for example, the router's status lights that are not visible in image 115 are visible in image 125 revealing, for example, that the last status light on the router is not operational. Moreover, while image 125 is much more viewable than is image 115, in both instances the receiving user received a lower-quality (e.g., 480p) image that correspond to the constraints, preferences, or requirements for the streaming data transmission between users, and those images used the same amount of data to transmit. Thus, as illustrated in FIGS. 1A and 1B, embodiments of the disclosure herein enable higher-quality and improved real-time streamlining experiences without compromising streaming requirements or limitations. For example, in the example of FIGS. 1A and 1B, transmitting image 110 when the user wants to zoom in on portion 112 essentially wastes data on image areas that are irrelevant to the viewing of portion 112, while image 125 uses the available bandwidth to provide a higher quality view of image 112.

FIG. 2 illustrates a flow diagram of an example embodiment that provides high-quality communications between users. As shown in the example of FIG. 2, live inputs 205 include live data inputs to the communication. These inputs may include things like video captured by a camera (e.g., smartphone camera, webcam, etc.); audio captured by a microphone, and other sensor data that may be transmitted between users. Live inputs 205 are created at the transmitting user's side, e.g., by their local devices. In particular embodiments, such inputs may be transmitted directly to other users with whom the user is communicating, or may be transmitted to intervening devices (e.g., server devices) involved in the user communication.

As explained above and illustrated by compressed live inputs 220 of FIG. 2, during real-time communications inputs such as images are often compressed before being transmitted to another user. This disclosure contemplates that compression may occur on devices at the transmitting user's side (e.g., by a smartphone of the transmitting user), by intervening computing devices (e.g., a sever computing device), or some combination thereof. Compressed live inputs 220 are ultimately transmitted to one or more other users, and the compressed live inputs 220 are provided as live outputs 225 to the other user. For example, live outputs 225 may include compressed images of a video stream transmitted by the transmitting user. As explained more fully herein, live outputs 225 may also include additional content, for example content that is predicted the receiving user may want to consume based on the receiving user's requests, preferences, or actions.

As illustrated in FIG. 2, receiving users may have live requirements and interactions 215 with live outputs 225. For example, live interactions may include the receiving user interacting with a live output image on their display, such as by zooming in or out of the image, rotating the image, or panning about the image. As another example, streaming requirements may include the bandwidth of a connection between the users for streaming data (e.g., the transmitting user's upload speed or the receiving user's download speed), or capabilities of the receiving user's device.

As illustrated in FIG. 2, live requirements and interactions 215 may be transmitted from the receiving user's device back to at least the device(s) that compressed the compressed live input 220. For example, if compression occurs at the transmitting user's device, then information about live requirements and interactions 215 are transmitted to the transmitting user's device. As another example, if compression occurs at a server device, then information about live requirements and interactions 215 are transmitted at least to the server device, and perhaps to the transmitting device, depending on where live preprocessing 210 occurs. While FIG. 2 illustrates live requirements and interactions 215 as coming from the receiving user, as will often be the case, some live requirements and interactions may come from or be determined by the transmitting user or by the capabilities of intervening components. For example, an upload bandwidth of the transmitting user may be a live requirement and interaction that is used to preprocess live input for transmission to a receiving user, as described herein.

Live requirements and interactions 215 may include user interactions with live outputs 225, such as zooming, rotating, or panning an image displayed on the receiving user's display. In particular embodiments, live requirements and interactions 215 may include image display resolution capabilities or preferences of the receiving user's device, connection speeds, desired field of view, color adjustment (e.g., dynamic range filters), image transforms or filters, or any suitable combination thereof As shown in FIG. 2, in response to receiving live requirements and interactions 215, live preprocessing 210 occurs. This preprocessing is applied to live inputs 205 as they are captured and prepared for transmission. For example, a receiving user may begin zooming in on content streamed from a transmitting user. The receiving user's zoom action is transmitted as part of live requirements and interactions 215. Live preprocessing 210 uses the information about the user's action, such as the fact that the user is zooming in, and the portion of the content being zoomed in on, and preprocess live inputs 205. For example, live preprocessing 210 may involve accessing, after receiving live requirements and interactions 215 indicating that a receiving user is zooming in, the next frame of live input 205. As explained herein, this frame may be relatively high-quality content, such as a higher resolution than is being streamed to the receiving user as live compressed input 220. Live preprocessing 210 takes the high-quality live input 205 and processes the high-quality content in accordance with the live requirements and interactions 215, for example by zooming subsequent frames of live input 205 in on the portion zoomed in on by the receiving user. Then, this high-quality preprocessed content is passed on to the computing device that creates live compressed input 220, which as described above may be the transmitting user's computing device, an intermediate computing device such as a server or connected secondary computing device such as a PC local to the transmitting user, or some combination thereof. The high-quality preprocessed content is then downgraded, e.g., by being compressed, and transmitted to the receiving user. However, because live preprocessing 210 uses high-quality content as the input for processing to focus on the portion of the content that the receiving user is interested in viewing, downgraded content data is dedicated to that portion the receiving user is interested in rather than being dedicated to, e.g., portions of live input 205 that are outside of the receiving user's field of view, which efficiently focuses data usage on content the receiving user is currently interested in viewing. For example, with reference to FIG. 1, zooming in on downgraded image 110 results in a very poor-quality image 115, while preprocessing image 120 to created zoomed-in image 125, and then downgrading zoomed-in image 125 and transmitting it as live compressed input, results in greatly improved image quality, even though both downgraded image 110 and downgraded image 125 require the same amount of data to transfer to a receiving user.

Figure 3:
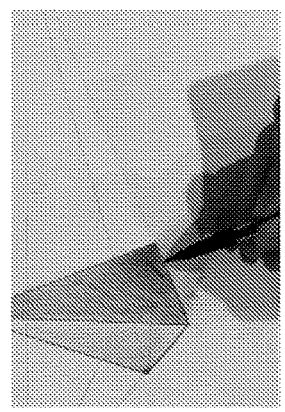
FIG. 3 illustrates an example embodiment of preprocessing live content.
Figure 3:
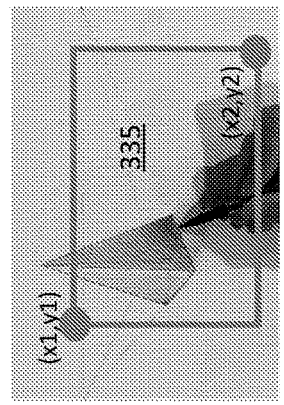
Figure 3:
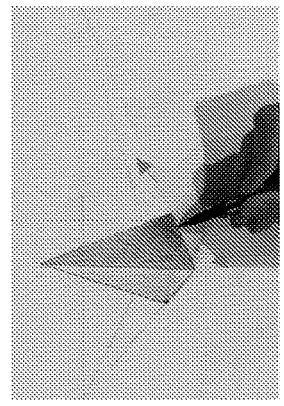
Figure 3:
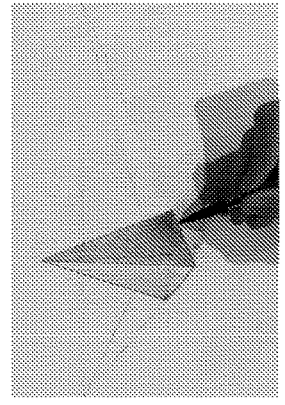

FIG. 3 illustrates an example embodiment of the example above. Image 310 illustrates an original high-resolution feed (e.g., 3840×2160), which may be the live input 205 in the example of FIG. 2. Image 320 illustrates a low-quality, compressed image (e.g., a live output 225 in the example of FIG. 2). Image 320 further illustrates a "zoom in" action being initiated by the receiving user on low-quality image 320. Image 330 illustrates a high-quality image with portion 335 identified as the region of interest, or field of view, requested by the requesting user as a result of their zoom-in action. Image 340 illustrated an example of a live preprocessing 210, which creates a zoomed-in image of portion 335, using as input the high-quality image of, e.g., live input 205. As described above, image 340 is then compressed and transmitted for viewing to the requesting user.

In particular embodiments, there may be some time lag between a receiving user's interaction with some content (e.g., with requesting a zoomed-in portion of an image) and the system providing a preprocessed image of the requested content. While such delay may not be a problem in asynchronous communications, such delay may be disruptive during synchronous communications. Therefore, in particular embodiments, the receiving user's device may temporarily modify a low-quality image stored on the receiving user's device while waiting for a preprocessed image to arrive. While the receiving user's content during this time will be inferior to the preprocessed stream, various image processing techniques may temporarily be used at the receiving user's device to maintain the synchronous nature of the communication. For example, the receiving user's device may simply begin modifying the image as requested, e.g., by zooming in on the image, in order to respond to the user's request, although the resulting image may appear as relatively low quality. In particular embodiments, the receiving user's device may use a local cache that stores received content. In particular embodiments, only certain content (e.g., every x frame, etc.) may be locally stored. In particular embodiments, this local cache may be accessed as a temporary placeholder while waiting for preprocessed content to arrive. For example, if a receiving user is viewing a preprocessed zoomed-in image and then begins zooming out, the receiving device may access the local cache to determine what content should begin appearing as the receiving user zooms out, for example because as described above, the data of the preprocessed zoomed-in image is devoted to the zoomed-in content, and there isn't data in the preprocessed image that represents the zoomed-out content.

Figure 4:
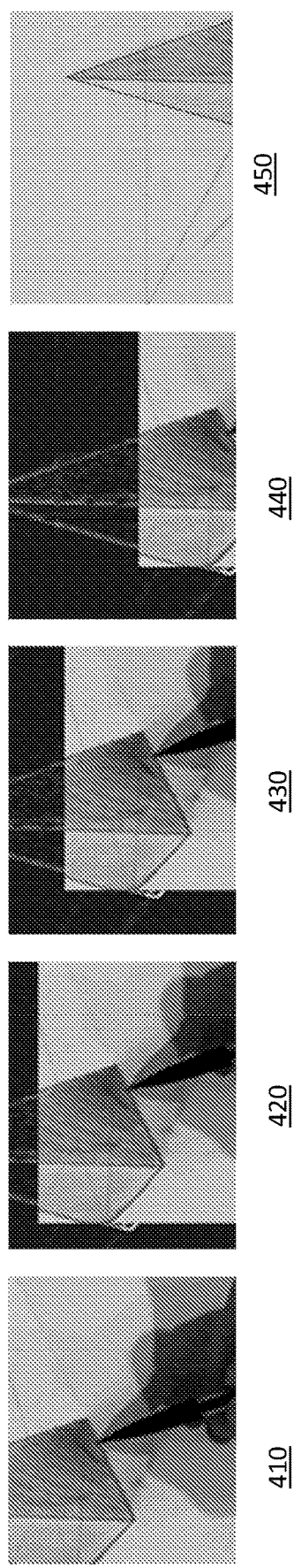
FIG. 4 illustrates an example technique for providing a temporary content to a user.

In particular embodiments, image processing may be used by the receiving user's device to provide a low-quality/lower-data portion of an image while waiting for a preprocessed image. For example, FIG. 4 illustrates processing techniques that the receiving device may temporarily use while waiting for a preprocessed image. As illustrated in FIG. 4, a user is viewing image 410, a preprocessed image of some zoomed-in content. If the user begins panning to a different portion of the content, the content that is not part of image 410 may be accessed from a local cache, and as illustrated in images 420, 430, and 440, this content may be presented in a lower-quality format until preposed image frame 450 arrives. Thus, the user's receiving device may only need to cache a smaller version of content received by the user.

While the example of FIG. 4 illustrates a particular processing technique, other techniques may be used. For example, a local cache may include storing images as received, and then those images may be used to temporarily display content to a receiving user. For example, rather than edge-based content as shown in the example of FIG. 4, the receiving user's device may temporarily provide blurrier content representing zoomed-in content on a cached compressed image as the user pans away from a view shown by high-quality preprocessed image 410.

In particular embodiments, content such as live inputs 205 may be cached in high-quality format. For example, FIG. 2. illustrates live inputs 205 being delivered to high-quality ("HQ") cache 230. As explained below, an HQ cache may be used to replay content that occurred earlier during a real-time communication, without requiring users to leave the communication or open a new application. In addition, as explained more fully below, an HQ cache may allow a user to request a modified version of earlier-provided content. In particular embodiments, modified content from HQ cache may be displayed to one, some, or all of the users participating in the communication.

In particular embodiments, an HQ cache may store full-resolution cameras feeds, uncompressed audio tracks, full HDR content, and/or other full-quality data from live inputs 205. In particular embodiments, the capture rate may be higher than the streaming rate (ex. 60 fps capture and 20 fps streaming), and in these circumstances the HQ Cache may be updated with content (e.g., additional frames) that is not streamed. In addition or the alternative, the HQ cache may record data from sensors that aren't immediately required by the live stream, such as for example alternate camera sources with different field of views, angles, frame rates, etc.; accelerometer, gyroscope, barometer, and GPS data; heart-rate or biometric data; 3D depth sensor data; touch/stylus activity log; and other Internal or external sensor data.

In particular embodiments, HQ cache may be stored on a computing device local to the transmitting user (which may optimize local performance and/or bandwidth limitations), on a server computing device, or some combination thereof. In particular embodiments, content from the HQ cache (or from an HQ cache, if multiple caches are stored, e.g., one local to a user and one at a server) may be deleted within a time after a live communication has ended, such as immediately after, 1 hour after, 1 day after, etc.

In particular embodiments, each user participating in a communication may have a local computing device that maintains an HQ cache of the live data produced by sensors in that user's environment. In particular embodiments, each user's local computing device may preprocess content for transmission to another user. In particular embodiments, a server-centric model may be used to allow a global HQ database to be maintained on one or more servers that receive and store high-quality sensor data from one or more participating users. This approach may require users being able to stream high-quality content to the server. In particular embodiments, a server device then compresses content and distributes the compressed content for viewing by users. In particular embodiments, the server can perform some or all of the preprocessing described herein.

In particular embodiments, a user may review content that was previously transmitted during a communication, identify a portion of a communication to view, and then may receive a compressed version of that portion as stored in the HQ cache. The content transmitted to a user may be a single object (such as a single frame) or stream (such as video content). In particular embodiments, content resulting from previous communications may be transmitted in full quality, as previous content may have characteristics of asynchronous communications (e.g., it is not necessary to maintain real-time communications, and/or a delay in receiving a previously viewed image may not disrupt the live feel of a simultaneously occurring synchronous communication that displays live content).

FIG. 2 illustrates an example of using HQ cache 230 that is preprocessed and compressed before transmitting to at least a requesting user. While the receiving user is viewing live content, such as live outputs 225, the user may wish to view previous content, such as an image or video clip containing content that was previously transmitted during the live communication. A UI may present previous content for the user to navigate through while still participating in the live communication. For example, a receiving user may be engaging in a video communication that occupies a full screen of the user's electronic device. The user may activate, e.g., a UI element that displays the live communication on a portion of the screen, such as the top portion, while displaying on, e.g., the lower portion of the screen, content (such as frames of content, descriptions of content, etc.) that was previously displayed to the receiving user. In particular embodiments, the receiving user's navigation is transmitted back to the transmitting user, so that the transmitting user also views the receiving user's navigation. In particular embodiments, only the receiving user views their navigation, and the transmitting user's view of the communication is not affected during the receiving user's navigation.

The receiving user may identify particular past content to view, such as a particular frame, a video etc., and in particular embodiments may also identify one or more modifications to such content (e.g., by zooming in on the content, requesting a slow-motion playback of such content, requesting a high-resolution version of such content, requesting a reverse playback of content, etc.). The receiving user's request is transmitted to the computing device hosting the HQ cache of the user who originally transmitted the requested content. The HQ cache is searched and relevant data, such as frames, from the HQ cache are identified based on the information transmitted from the receiving user. In particular embodiments, as shown in the example of FIG. 2, on-demand preprocessing 235 may occur, e.g., to zoom-in on a portion of a high-quality image stored in the HQ cache. In particular embodiments as shown in the example of FIG. 2, output from the HQ cache may be compressed as compressed on-demand output 240 for transmission to the requesting user, and the resulting on-demand output 245 may be displayed to the receiving user, e.g., on the computing device used to engage in the live communication. In particular embodiments, high-quality content from an HQ cache may be transmitted to the requesting user without downgrading such as compression. In particular embodiments, on-demand content displayed to the receiving user may also be displayed to a transmitting user or to other receiving users, either automatically or upon request by the requesting user or by the transmitting user. In particular embodiments, annotations to live content or to on-demand content made by one user may be displayed to other users.

While this disclosure described one user as being a "transmitting user" and another as being a "receiving user," in synchronous communications both users (or, all users, if more than two users are communicating) are often both receiving users and transmitting users. Thus, in the examples described above, the receiving user would also be the transmitting user for inputs captured at the receiving user's end, and the storage and flow of data transmitted from that user to the other user would operate as described herein.

In particular embodiments, when streaming content (either on-demand from an HQ cache or as part of the live stream), additional data may be sent along with the content. For example, a majority (e.g., 90%) of the bandwidth may be dedicated to the primary content (e.g., live content) while the rest of the bandwidth (e.g., 10%) may be dedicated to supplemental data. Supplemental data may include, for example, content outside of the current field of view of the main content being streamed, for example in case a user decides to zoom out, rotate, or pan on, content the user is viewing. For example, supplemental content may be provided in addition to or in the alternative to a user having a local cache that stores content (such as previously viewed content) for temporary use until preprocessed content arrives. As described above, supplemental content may be a relatively lower-quality version of compressed content, such as edge-based drawings, lower resolution content, grey-scaled content, etc. When a user navigates away from currently transmitted content or zooms in on such content, the lower quality supplemental data may be temporarily provided until a preprocessed content stream arrives in accordance with the requesting user's viewing request. For example, the relatively low-quality content shown in images 420-440 of FIG. 4 may be streamed as supplemental content to a receiving user. In particular embodiments, transmitting supplemental data ensures that a user can perform modifications of viewed content, even if such modifications result in displaying content that has not been previously viewed and therefore could not be provided by a local cache.

In particular embodiments, a content stream (whether live or on-demand) may include content determined based on anticipated actions of the receiving user. For example, a user's likely actions relating to content views or requests may be predicted, e.g., by the receiving device, a server device, or the transmitting device, or some combination thereof, and additional content related to the predicted actions may preprocessed and transmitted to the receiving user. For example, predictions may be based on UI interactions made by the requesting user, such as placing two fingers on the screen in preparation for a zooming action, or beginning to pan a view of an image in a particular direction. In particular embodiments, anticipatory content may be provided at a relatively lower quality than primary live or on-demand content, such as for example using the image processing techniques discussed herein in reference to supplemental content.

Examples of anticipatory streaming triggers include a user panning, rotating, or zooming in a particular direction. Information about the user's interaction may be passed to the transmitting device, e.g., to the device that performs live preprocessing 210 in the example of FIG. 2. Based on the user interaction, a prediction may be made about future requested content. For example, content that would be displayed if the user continued the user action (e.g., continue panning or zooming) may be preprocessed and transmitted to the receiving user as anticipatory content. In particular embodiments, the anticipatory content may depend on a value or degree of user interaction, such as a speed with which the user is zooming, rotating, or panning. As another example, a prediction may be based on a detection that the center of attention is moving in a given direction (e.g., optical flow). As another example, a prediction may be based on detected motion in a small region of an otherwise stationary field of view. In particular embodiments, a zoom, rotation, or pan trajectory may be predicted, and content corresponding to the predicted trajectory may be provided as anticipatory content along with the primary live or on-demand content being transmitted. In particular embodiments, anticipatory content may use past content (e.g., from an HQ cache), live content, or both to provide the anticipatory content to a receiving user.

In particular embodiments, predications may be based on previous user actions within a communication session (e.g., data indicating that a user will zoom based on past zooming behavior). In particular embodiments, user-specific information may be aggregated across that user's communications sessions, e.g., to create a prediction profile for a specific user. In particular embodiments, data from multiple users may be aggregated to create templates for predicted user actions, and anticipatory content may be based on comparing live user actions with such templates.

In particular embodiments, UI elements may be provided to enable user interactions. For example, UI buttons may be provided to zoom, save, fit, follow, record, navigate through previous content, etc. In particular embodiments, user interactions with other GUI portions may also provide information about user actions and intentions. For example, hovering over a "zoom" button may trigger an anticipatory stream to be rendered to handle zoom events. As another example, moving a "seek bar" or "scrub bar" may trigger the loading of high-resolution frames at each timestamp passed. As another example, removing a stylus from its holder may trigger a high-resolution preload in anticipation of annotation. As another example, a 1-finger touch event on a display may trigger anticipation of 2-finger touch gestures (zoom, pan, etc.)

In particular embodiments, supplemental data or preprocessing (or both) may occur in response to predicted user interactions. For example, a receiving user may be viewing a live stream. The receiving user may touch their screen, and this information may be transmitted to, e.g., the preprocessor, which begins streaming supplemental content outside the bounds of the live field of view in anticipation of a zoom, rotation, or pan action. If the receiving user in fact zooms out, for example, temporary content from the supplemental content or from a local cache may be displayed to the receiving user while the user's zoom-out is communicated to the preprocessor so that a higher quality preprocessed image (either live or on-demand) corresponding to the requesting user's action can be prepared and transmitted to the receiving user. Once the receiving user receives the preprocessed content (or, in particular embodiments, full-quality on-demand content), the received content replaces the temporary content on the receiving users' device.

In particular embodiments, a communication may involve more than one user. In these embodiments, preprocessed content may be requested by a particular user, and this preprocessed content may be provided to only that receiving user, without being transmitted to other users. Thus, multiple streams may be provided from a transmitting user or server device to different users, based on those users' requests and interactions. In particular embodiments, any preprocessed stream may be streamed to all participating users from a transmitting user or server device, such that a request from any user for preprocessed content results in a preprocessed stream being delivered to all receiving users. In particular embodiments, as the number of users participating in a communication grows, functionality such as a request for control or a specific approval process (e.g., by the transmitting user) may be used to allow one requesting user to request preprocessed content that will be delivered to all receiving users. In other words, permissions may be required to control the preprocessing functionality and streaming provided by a transmitting device.

In particular embodiments, one or more users observing a live stream may flag or mark live content to potentially refer to later, e.g., with a bookmark or a tag, or may mark such content with a reaction such as, e.g., an emoji. In particular embodiments, marked content may be used to create summaries or collections of key moments, which may be accessible during the live communication, after the communication, or both. In particular embodiments, marked content may provide for easier scrolling or perusal of previous content, e.g., in order to identify specific content to request from the HQ cache.

This disclosure contemplates that the systems and methods described herein may be used to improve any live electronic communication. For example, as shown in FIG. 1, a transmitting user may be troubleshooting a piece of equipment such as a router. The transmitting user with the equipment may not know which content to send to the receiving user, and it may be complicated for the receiving user to verbally direct the transmitting user to focus on content the receiving user cares about (e.g., a car mechanic may have trouble explaining which cart part to hold a camera up to if a user does not know the part names). However, as described herein the receiving user may identify which content, either live or in the past, is most relevant, and rather than having to work with a low-quality version based on what the transmitting user is providing, the receiving user can receive a preprocessed, higher quality version of the content that the receiving user finds most relevant. Therefore, the receiving user is able to replicate beneficial aspects as if the receiving user where physically present, such as, e.g., being able to take a closer look at particular content of their choosing. Moreover, embodiments of preprocessing and caching described herein allow a receiving user to focus on content that has been previously displayed while still maintaining live aspects (e.g., audio, video) of a synchronous communication, without needing the transmitting user to provide current transmission of the content the receiving user finds most relevant. Similarly, remote work, personal training, or doctor visits are all examples of electronic communication that systems and methods described herein may improve.

Figure 5:
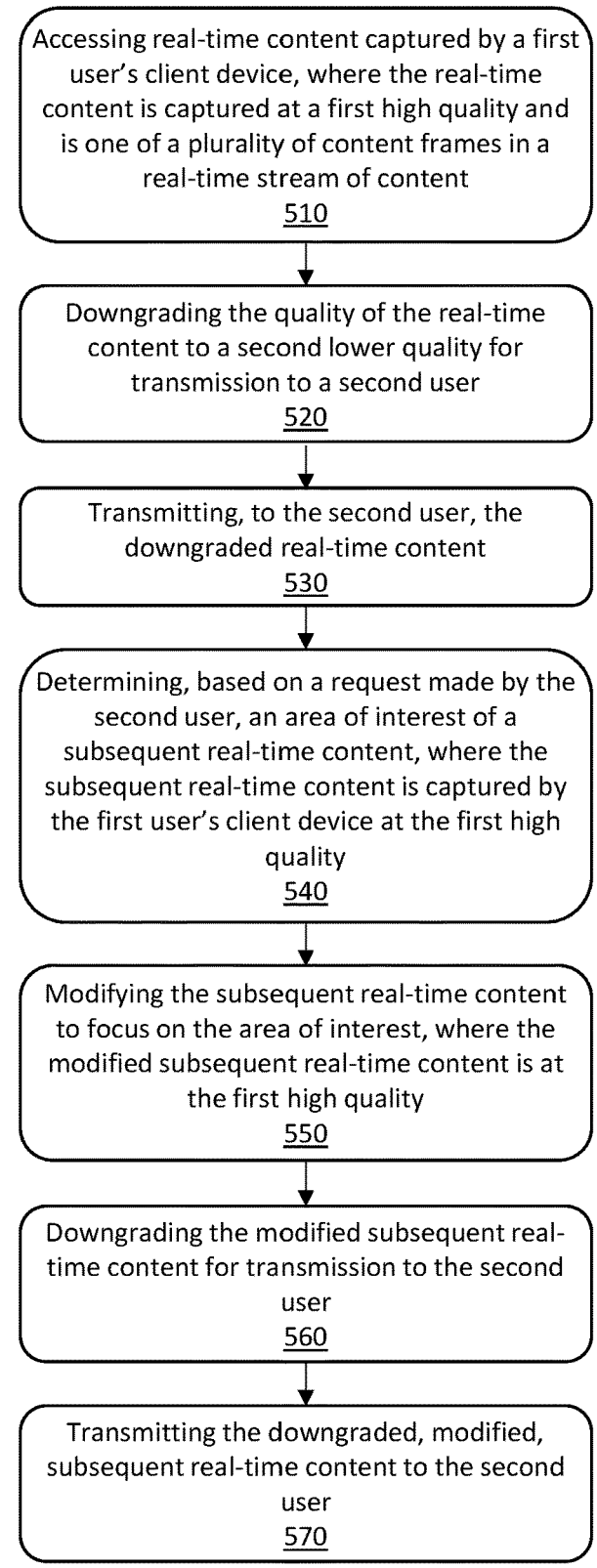
FIG. 5 illustrates an example procedure for providing high-quality electronic communications between users.

FIG. 5 illustrates an example method for providing high-quality electronic communications between users. The method of FIG. 5 may begin at step 510, which includes accessing real-time content captured by a first user's client device, where the real-time content is captured at a first high quality and is one of a plurality of content frames in a real-time stream of content. For example, the real-time content could be frames of real-time video captured by a camera of a transmitting user's smartphone.

Step 520 includes downgrading the quality of the real-time content to a second lower quality for transmission to a second user. For example, as described more fully herein, content captured by a first user's device(s) may be captured at a relatively high quality and compressed for transmission to a receiving user. Step 530 includes transmitting, to the second user, the downgraded real-time content.

Step 540 of the method of FIG. 5 includes determining, based on a request made by the second user, an area of interest of a subsequent real-time content (such as a subsequent frame of a real-time video stream), where the subsequent real-time content is captured by the first user's client device at the first high quality. As explained more fully herein, the request from the first user may include live requirements and interactions, such as live requirements and interactions 215.

Step 550 includes modifying the subsequent real-time content to focus on the area of interest, where the modified subsequent real-time content is at the first high quality. For example, as explained more fully herein, a high-quality image may be modified (or preprocessed) to zoom-in on a particular portion of the high-quality image that the receiving user is zooming in on or has indicated an interest in zooming in on.

Step 560 includes downgrading the modified subsequent real-time content for transmission to the second user, such as by compressing the content, and step 570 includes transmitting the downgraded, modified, subsequent real-time content to the second user.

Figure 6:
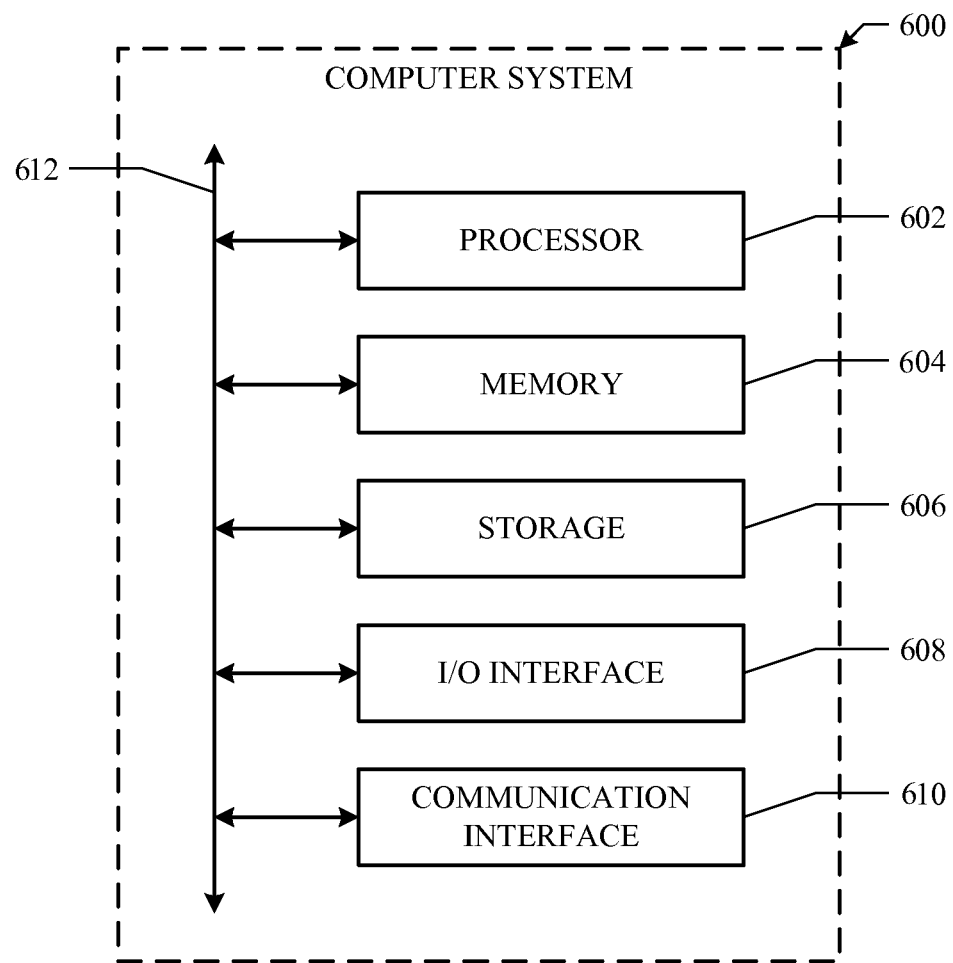
FIG. 6 illustrates an example computing device.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 5. Moreover, this disclosure contemplates that some or all of the computing operations described herein, including certain steps of the example method illustrated in FIG. 5, may be performed by circuitry of a computing device described herein, by a processor coupled to non-transitory computer readable storage media, or any suitable combination thereof FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, a head-mounted display such as an AR/VR headset, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   accessing real-time content captured by a first user's client device, wherein the real-time content is captured at a first high quality and is one of a plurality of content frames in a real-time stream of content;
   downgrading the quality of the real-time content to a second lower quality for transmission to a second user;
   transmitting, to the second user, the downgraded real-time content;
   determining, based on a request made by the second user, an area of interest of a subsequent real-time content, wherein the subsequent real-time content is captured by the first user's client device at the first high quality;
   modifying the subsequent real-time content to focus on the area of interest, wherein the modified subsequent real-time content is at the first high quality;
   downgrading the modified subsequent real-time content for transmission to the second user and
   transmitting the downgraded, modified, subsequent real-time content to the second user.

2. The method of claim 1, wherein the request made by the second user comprises an interaction with a user interface of a computing device of the second user that is displaying the real-time stream of content.

3. The method of claim 2, wherein the request comprises zooming in or zooming out of the downgraded real-time content.

4. The method of claim 2, wherein the request comprises panning the downgraded real-time content.

5. The method of claim 1, wherein the real-time content comprises one or more images.

6. The method of claim 1, wherein downgrading comprises compressing.

7. The method of claim 1, further comprising transmitting, to the second user and along with the downgraded content, supplemental content that corresponds to the concurrently transmitted downgraded content.

8. The method of claim 7, wherein the supplemental content comprises content adjacent to and outside of the field of view of the concurrently transmitted downgraded content.

9. The method of claim 1, further comprising transmitting, to the second user, anticipatory content based on information about one or more interactions between the second user and a computing device on which the real-time stream of content is displayed.

10. The method of claim 9, wherein the interactions comprise a movement of at least part of the second user's hand on or near a display of the computing device.

11. The method of claim 1, further comprising storing in a high-quality cache a high-quality copy of the real-time stream of content.

12. The method of claim 11, further comprising transmitting, in response to a request from the second user for past content in the real-time stream of content, a content frame representing the past content in the real-time stream of content, wherein the past content is transmitted during a time that the real-time stream of content is also transmitted to the second user.

13. A system comprising one or more processors and a non-transitory computer readable storage media embodying instructions coupled to the one or more processors, the one or more processors operable to execute the instructions to:
   access real-time content captured by a first user's client device, wherein the real-time content is captured at a first high quality and is one of a plurality of content frames in a real-time stream of content;
   downgraded the quality of the real-time content to a second lower quality for transmission to a second user;
   transmit, to the second user, the downgraded real-time content;
   determine, based on a request made by the second user, an area of interest of a subsequent real-time content, wherein the subsequent real-time content is captured by the first user's client device at the first high quality;
   modify the subsequent real-time content to focus on the area of interest, wherein the modified subsequent real-time content is at the first high quality;
   downgrade the modified subsequent real-time content for transmission to the second user and
   transmit the downgraded, modified, subsequent real-time content to the second user.

14. The system of claim 13, wherein the processors are further operable to execute the instructions to transmit, to the second user and along with the downgraded content, supplemental content that corresponds to the concurrently transmitted downgraded content.

15. The system of claim 13, wherein the processors are further operable to execute the instructions to transmit, to the second user, anticipatory content based on information about one or more interactions between the second user and a computing device on which the real-time stream of content is displayed.

16. The system of claim 13, wherein the processors are further operable to execute the instructions to store in a high-quality cache a high-quality copy of the real-time stream of content.

17. One or more non-transitory computer readable storage media embodying instructions and coupled to one or more processors that are operable to execute the instructions to:
   access real-time content captured by a first user's client device, wherein the real-time content is captured at a first high quality and is one of a plurality of content frames in a real-time stream of content;
   downgraded the quality of the real-time content to a second lower quality for transmission to a second user;
   transmit, to the second user, the downgraded real-time content;
   determine, based on a request made by the second user, an area of interest of a subsequent real-time content, wherein the subsequent real-time content is captured by the first user's client device at the first high quality;
   modify the subsequent real-time content to focus on the area of interest, wherein the modified subsequent real-time content is at the first high quality;

downgrade the modified subsequent real-time content for transmission to the second user and transmit the downgraded, modified, subsequent real-time content to the second user.

18. The media of claim 17, wherein the processors are further operable to execute the instructions to transmit, to the second user and along with the downgraded content, supplemental content that corresponds to the concurrently transmitted downgraded content.

19. The media of claim 17, wherein the processors are further operable to execute the instructions to transmit, to the second user, anticipatory content based on information about one or more interactions between the second user and a computing device on which the real-time stream of content is displayed.

20. The media of claim 17, wherein the processors are further operable to execute the instructions to store in a high-quality cache a high-quality copy of the real-time stream of content.

* * * * *